United States Patent Office 3,524,223
Patented Aug. 18, 1970

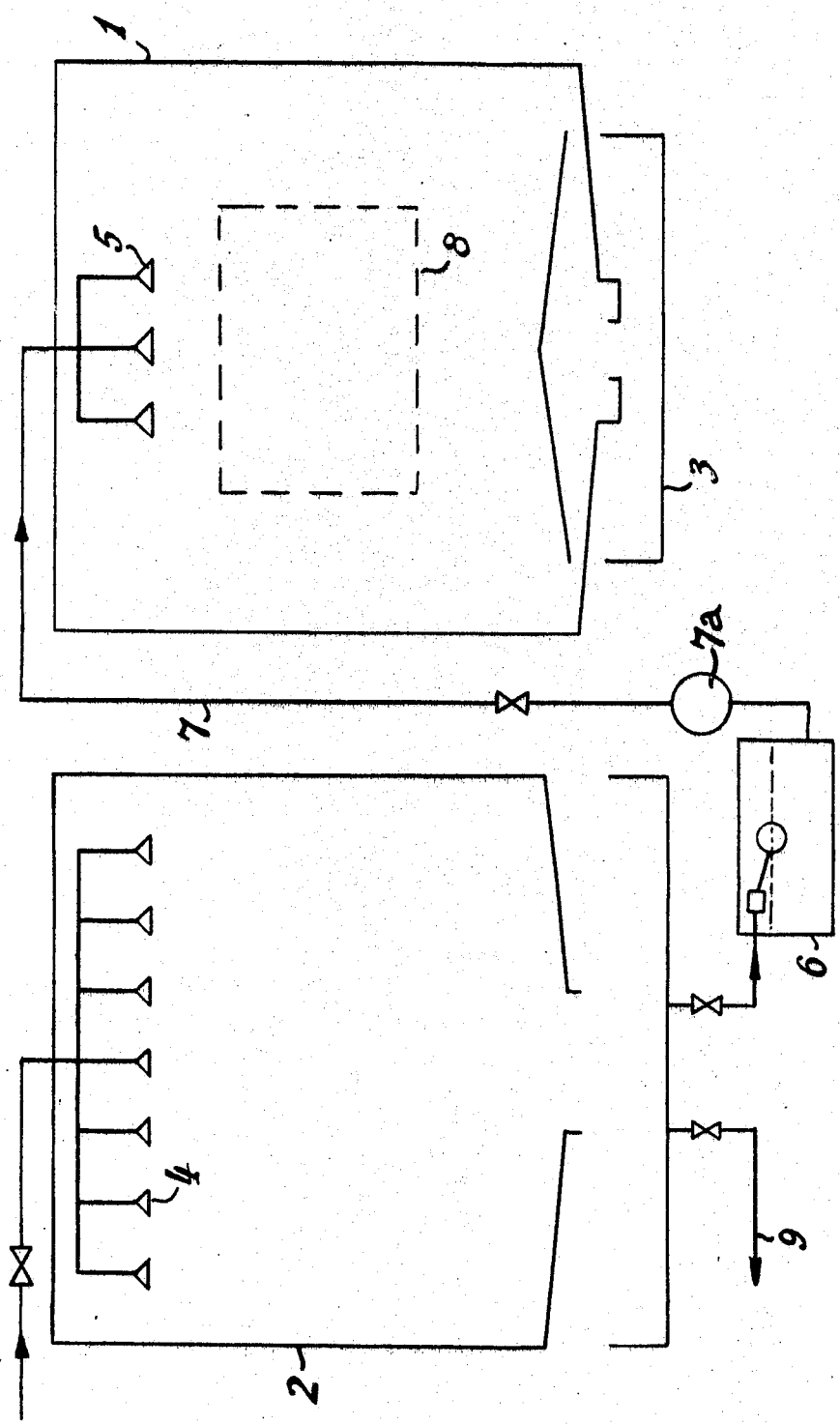

3,524,223
ROTATIONAL MOULDING APPARATUS
Aubrey J. Westbrook, Kilwinning, Ivan D. M. Thomson, Irvine, Scotland, assignors to Plastic Rotational Mouldings Limited, London, England, a British company
Filed July 22, 1968, Ser. No. 746,401
Claims priority, application Great Britain, July 26, 1967, 34,310/67
Int. Cl. B29c 5/00
U.S. Cl. 18—26      2 Claims

ABSTRACT OF THE DISCLOSURE

This invention relates to a rotational moulding apparatus comprising a heating chamber, means to spray a hot water-soluble molten salt onto a mould in the heating chamber, a cooling chamber, means to spray water into the cooling chamber, means to collect the initial water sprays used in the cooling chamber and means to return the collected water to the heating chamber to effect a pre-wash on a subsequent mould before it leaves the heating chamber. The invention also extends to a method of reducing wastage of water-soluble salt used as a heating medium in a rotational moulding apparatus which comprises retaining the cooling water first used in a cooling chamber and spraying this back onto a mould in the heating chamber at the end of a subsequent heating operation.

---

This invention relates to moulding apparatus of the kind in which a heated hollow mould containing a hardenable liquid composition is rotated about two axes (normally mutually perpendicular axes) until the composition hardens as a coating of substantially uniform thickness on the internal surface of the mould. Throughout this specification such moulding apparatus will be referred to as "rotational moulding apparatus."

One desirable method of heating the hollow mould in rotational moulding apparatus comprises the use of a molten salt of high thermal capacity which is sprayed onto the external surface of the mould. One such salt which can effectively be used is an eutectic mixture of 53% potassium nitrite, 40% sodium nitrite and 7% sodium nitrate which melts at around 160° C. and can be safely employed at an operating temperature of around 350° C. This salt is soluble in water and enables very rapid heating cycles to be employed.

It is customary to cool the mould after heating by spraying the external surfaces thereof with water, and where a water-soluble eutectic salt has been employed for the heating stage, the initial sprays of water will remove the salt left adhering to the mould and unless steps are taken to recover it, will flow with the cooling water to waste.

This invention also relates to a method of reducing wastage of water-soluble salt used as the heating medium in a rotational moulding apparatus.

It has been discovered that worthwhile economies can be obtained when operating rotational moulding apparatus with a water-soluble eutectic salt as heating medium, by retaining the cooling water first used in a cooling chamber and spraying this back onto a mould in the heating chamber at the end of a subsequent heating operation.

By controlling the amount of water which is collected and the amount which is used in the heating station in the subsequent spraying operation, it is possible to recover a substantial percentage of the salt which would otherwise have been lost without unduly cooling the molten salt (commonly stored in a molten salt tank located below the floor of the heating chamber).

One specific form of rotational moulding apparatus in accordance with the invention will now be described, by way of example, with reference to the accompanying drawing, which shows, purely schematically, the salt recovery system.

The apparatus comprises a heating chamber 1 and an adjacent cooling chamber 2. Mounted below the floor of the chamber 1 is a tank 3 which contains molten salt used for heating moulds within the chamber 1. A plurality of water sprays 4 are provided in the roof of the chamber 2 and further water sprays 5 are provided in the roof of the chamber 1. A saline solution tank 6 is provided and feeds the sprays 5 via a pump 7a and a return pipe 7.

The procedure adopted is as follows:

It will be assumed that a mould (generally designated 8) has just been heated in the chamber 1 by spraying it with molten salt pumped from the tank 3. The heated mould is passed into the chamber 2 and is then sprayed with water from the jets 4. The mould 8 is coated with salt which is washed off with the initial spray, which has the highest saline content, and this initial spray is collected in the tank 6. After a finite period of time, sufficient to allow the salinity of the cooling water to drop to an acceptabe level, the drain from the chamber 2 to the tank 6 is shut off and the cooling operation is completed with the cooling water flowing to waste via a pipe 9. When the next mould has completed its heating cycle in the chamber 1, an initial cooling is accomplished in the chamber 1 by pumping saline solution from the tank 6 through the return line 7 to the sprays 5. The pre-cooled and pre-washed mould now enters the chamber 2 where normal cooling is commenced, once again the initial flows of cooling water (i.e. those of highest salinity) being collected in the tank 6 for employment as pre-cooling and pre-washing sprays in the chamber 1 with the next mould.

The initial flows of cooling water employed in the chamber 2 become heated by contact with the mould and to conserve this heat it is desirable to thermally insulate the tank 6.

What is claimed is:
1. Rotational moulding apparatus comprising a heating chamber, means to spray a hot water-soluble molten salt onto a mould in the heating chamber, a cooling chamber, means to spray water into the cooling chamber, means to collect the water initially employed to cool a mould in the cooling chamber and means to supply the collected water to the heating chamber to effect pre-washing of a mould before it leaves the heating chamber.

2. Rotational moulding apparatus as claimed in claim 1, in which the means to collect the water initially employed to cool the mould in the cooling chamber comprises a thermally insulated tank.

References Cited

UNITED STATES PATENTS

| | | |
|---|---|---|
| 2,629,131 | 2/1953 | Martin et al. |
| 3,041,671 | 7/1962 | Ericson. |
| 3,233,287 | 2/1966 | Blue. |

WILLIAM J. STEPHENSON, Primary Examiner